United States Patent
McKsymick (10) Patent No.: US 12,440,020 B1
(45) Date of Patent: Oct. 14, 2025

(54) PORTABLE STANDING DESK ASSEMBLY

(71) Applicant: Mark J. McKsymick, Fountain Hills, AZ (US)

(72) Inventor: Mark J. McKsymick, Fountain Hills, AZ (US)

( * ) Notice: Subject to any disclaimer, the term of this patent is extended or adjusted under 35 U.S.C. 154(b) by 135 days.

(21) Appl. No.: 18/378,713

(22) Filed: Oct. 11, 2023

(51) Int. Cl.
    *A47B 3/10* (2006.01)
    *A47B 3/12* (2006.01)
    *A47B 9/20* (2006.01)
    *A47B 21/02* (2006.01)

(52) U.S. Cl.
    CPC .............. *A47B 3/10* (2013.01); *A47B 3/12* (2013.01); *A47B 9/20* (2013.01); *A47B 21/02* (2013.01); *A47B 2200/0086* (2013.01)

(58) Field of Classification Search
    CPC .... A47B 3/10; A47B 3/12; A47B 9/00; A47B 9/20; A47B 21/02; A47B 2200/0086; A47B 85/06; A47B 96/06; A47B 57/26; A47C 3/28; F16B 7/04; F16B 7/0466; F16B 7/10; F16B 12/20; F16B 12/30
    USPC ...... 108/33, 34, 189, 177; 248/229.1, 229.2, 248/124.2, 643; 403/299, 362
    See application file for complete search history.

(56) References Cited

U.S. PATENT DOCUMENTS

| | | | |
|---|---|---|---|
| 3,315,621 A | 4/1967 | Szmber | |
| 4,443,128 A * | 4/1984 | Yamamoto | F16M 11/08 403/388 |
| 4,727,390 A * | 2/1988 | Brown | F16M 11/2092 396/428 |
| 6,311,944 B1 | 11/2001 | McKsymick et al. | |
| 6,637,350 B2 * | 10/2003 | McKsymick | A47B 21/00 108/90 |
| 8,616,354 B2 | 12/2013 | Azirian | |
| 9,504,316 B1 | 11/2016 | Streicher et al. | |
| 10,130,166 B1 | 11/2018 | Prokopovich | |
| 10,537,171 B2 * | 1/2020 | Melaragno | A47B 5/04 |
| 2005/0150432 A1 | 7/2005 | Wen | |
| 2010/0224532 A1 | 9/2010 | Gonzalez | |
| 2017/0354245 A1 | 12/2017 | Martin et al. | |
| 2019/0254417 A1 * | 8/2019 | McKsymick | A47B 3/06 |
| 2021/0289937 A1 * | 9/2021 | Scharfenkamp | A47B 9/20 |
| 2023/0013573 A1 * | 1/2023 | McFadden | A47B 85/08 |

* cited by examiner

*Primary Examiner* — Daniel J Troy
*Assistant Examiner* — Elizabeth Irene Artalejo
(74) *Attorney, Agent, or Firm* — Gugliotta & Gugliotta LPA (57) ABSTRACT

A collapsible table system designed to transition between configurations as a sitting desk, standing desk, and a transport case. The system includes a tabletop assembly that also serves as a storage box for system components and additional attachments, a height adjustment support system with telescoping legs, and a stabilization system. The tabletop assembly comprises a reversible cover that can extend the work surface, and the height of the work surface is adjustable through telescoping legs which can be locked at various heights to accommodate different use scenarios. The stabilization system utilizes clamping mechanisms and stability members, creating a structural web to enhance the stability, especially in the standing desk configuration. Attachments, such as wheels and holders, may be selectively connected to the tabletop and stored within it when not in use, offering adaptability and functionality in various use cases.

9 Claims, 11 Drawing Sheets

PORTABLE STANDING DESK ASSEMBLY

RELATED APPLICATIONS

There are no previously filed, nor currently any co-pending applications, anywhere in the world.

BACKGROUND OF THE INVENTION

1. Field of the Invention

The present invention relates generally to a portable table for holding and supporting laptop computers, projectors, and associated components and, more particularly, to an improved portable, compact computer stand that is adapted to transition between a portable sitting desk, a portable standing desk and a case configuration for easy transport.

2. Description of the Related Art

Any discussion of the related art throughout the specification should in no way be considered as an admission that such related art is widely known or forms part of common general knowledge in the field.

Standing desks, synonymous with adjustable workstations, have woven themselves into various settings, including offices, educational institutions, and home environments, serving as a versatile tool that harmonizes with dynamic use and adaptability. Embracing the idea of a health-conscious work or learning environment, these desks subtly encourage physical activity and promote an upright posture, attributes that are quintessential in alleviating common issues like back and neck pain. Notably, the incorporation of standing desks is often associated with an array of physical health benefits, such as reduced risk of weight gain and minimized blood sugar levels post meals. In the psychological realm, the ergonomic furnishing potentially uplifts moods, bolsters energy levels, and enhances productivity by fostering an environment conducive to focused concentration. Furthermore, standing desks amplify engagement and collaboration, rendering them particularly beneficial in interactive sessions and collaborative learning or working scenarios. These desks do not merely serve as a tool for improved collaboration but also morph into an ergonomic advantage by offering customizable setups and versatility across varied activities. With the potential to lower risks associated with heart disease and other chronic conditions, standing desks are celebrated for their potential long-term health benefits.

While standing desks offer numerous health and ergonomic benefits, they are not typically designed to be easily portable for travel due to a variety of reasons. Firstly, their structural complexity and dimensions, which cater to the stability needed to support work equipment like computers, monitors, and other accessories, inherently demand a certain bulk and weight. This foundational stability tends to require robust materials and supportive mechanics, which inadvertently add to the overall weight and reduce portability. Additionally, the mechanisms that allow for height adjustment, such as pneumatic lifts or electronic motors, further incorporate additional weight and potential fragility into the design. Transporting such desks could expose them to risks of damage and misalignment of their intricate adjustment systems. Furthermore, the assembly and disassembly process of standing desks can be quite involved and time-consuming, which is not conducive to the fast-paced nature of travel. Also, given their size even when compacted for transit, carrying a standing desk could be impractical in many travel contexts due to the sheer physical burden and space requirements. Practicality also comes into play, where the utility of carrying a sizable desk does not outweigh the inconvenience of transport, especially considering the availability of workstations in numerous locations like hotels, libraries, and co-working spaces.

Thus, while standing desks provide an array of benefits in static environments, their design and structure do not lend themselves to be conveniently portable for frequent travel scenarios. Consequently, a need has been felt for providing a portable, compact computer stand having an adjustable height for supporting laptop computers and components that are both easily portable and adjustable between sitting and standing functions.

SUMMARY OF THE INVENTION

It is thus an object of the present invention to provide a portable lightweight adjustable height compact desk for mobility.

It is a feature of the present invention to provide such a portable compact desk that is adjustable between sitting and standing functions.

It is an additional feature of the present invention to portable compact desk that incorporates wheels to facilitate mobility while deployed.

Briefly described according to the preferred embodiment of the present invention, a computer stand, which is both portable and compact, is disclosed. The computer stand features a collapsible table comprising a generally planar tabletop, said tabletop having a cavity on its lower end configured to store various components including but not limited to telescoping legs, clamps, stabilizing members, and attachments. The telescoping legs are removably connectable to the lower end of the tabletop, capable of supporting said tabletop at multiple heights and are storable within the cavity when in a case configuration. The table system further comprises a generally planar table bottom, designed to slidably interface with the tabletop via a plurality of linearly elongated channels formed along the table bottom. The channels serve as a track guide, engaging an L-shaped track receiving lip of the tabletop, and include a plurality of spring-loaded detents situated at intervals along their length to permit selective linear adjustment of the tabletop. A medium-density, closed cell foam insert, dimensionally configured to fit within an accessory insert receiving cavity in the table bottom, is utilized to store telescoping legs and additional accessories.

The present invention may further incorporate article holders for organizing accessories such as cellular phones and beverage containers. A cellular phone storage adapter is provided, comprising a separable housing and an attachment pin, forming a containment cavity. Said attachment pin, cantilevered from the outer periphery of the housing, is designed for attachment through impingement with a receiving hole in the tabletop.

The present invention provides a solution for enabling the transport and use of a computer stand with integrated storage and auxiliary support functionalities.

Further, the computer stand of the present invention may allow for the benefits of a standing desk when deployed.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. The foregoing broadly outlines various embodiments of the collapsible table system to facilitate understanding and appreciation of the present contribution to the art. Additional embodiments forming the subject matter of the appended claims will be described hereinafter. It should be understood that the collapsible table system is not confined to specific construction details or component arrangements as described and illustrated. The system may encompass other embodiments and can be practiced or executed in various ways. Furthermore, the phraseology and terminology utilized herein are for descriptive purposes and should not be deemed limiting. Numerous alternative embodiments could be implemented, using either current technology or technology developed after the filing date of this patent, which would still fall within the scope of the claims.

Finally, unless a claim element is defined by reciting the word "means" and a function without the recital of any structure, it is not intended that the scope of any claim element be interpreted based on the application of 35 U.S.C. § 112 (f).

The best mode for carrying out the invention is presented in terms of its preferred embodiment, herein depicted within the Figures.

1. Detailed Description of the Figures

The present invention discloses a collapsible table system, denoted generally as 10, uniquely designed to seamlessly transition between configurations as a sitting desk, a standing desk, and a transport case. This system fundamentally consists of a tabletop assembly, a height adjustment support system, and a stabilization system, each cohesively interacting to enable configurational transitions and supplementary functionalities enabled by optional attachments.

Figure 1A:
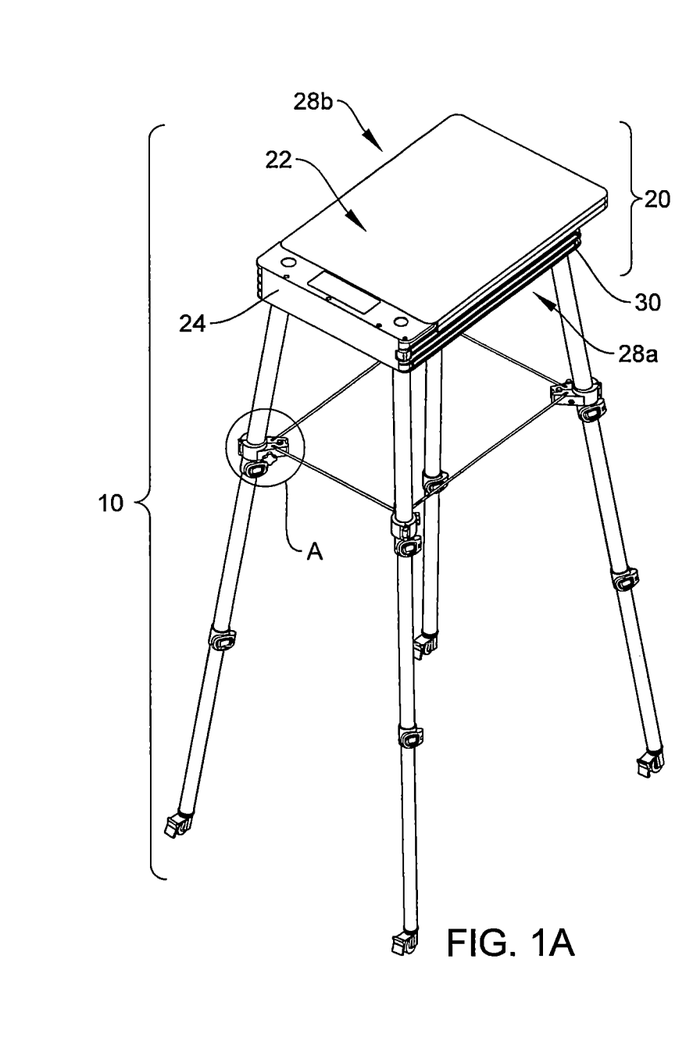
FIG. 1A is a front perspective views of a portable standing desk assembly according to the preferred embodiment of the present invention.
Figure 1B:
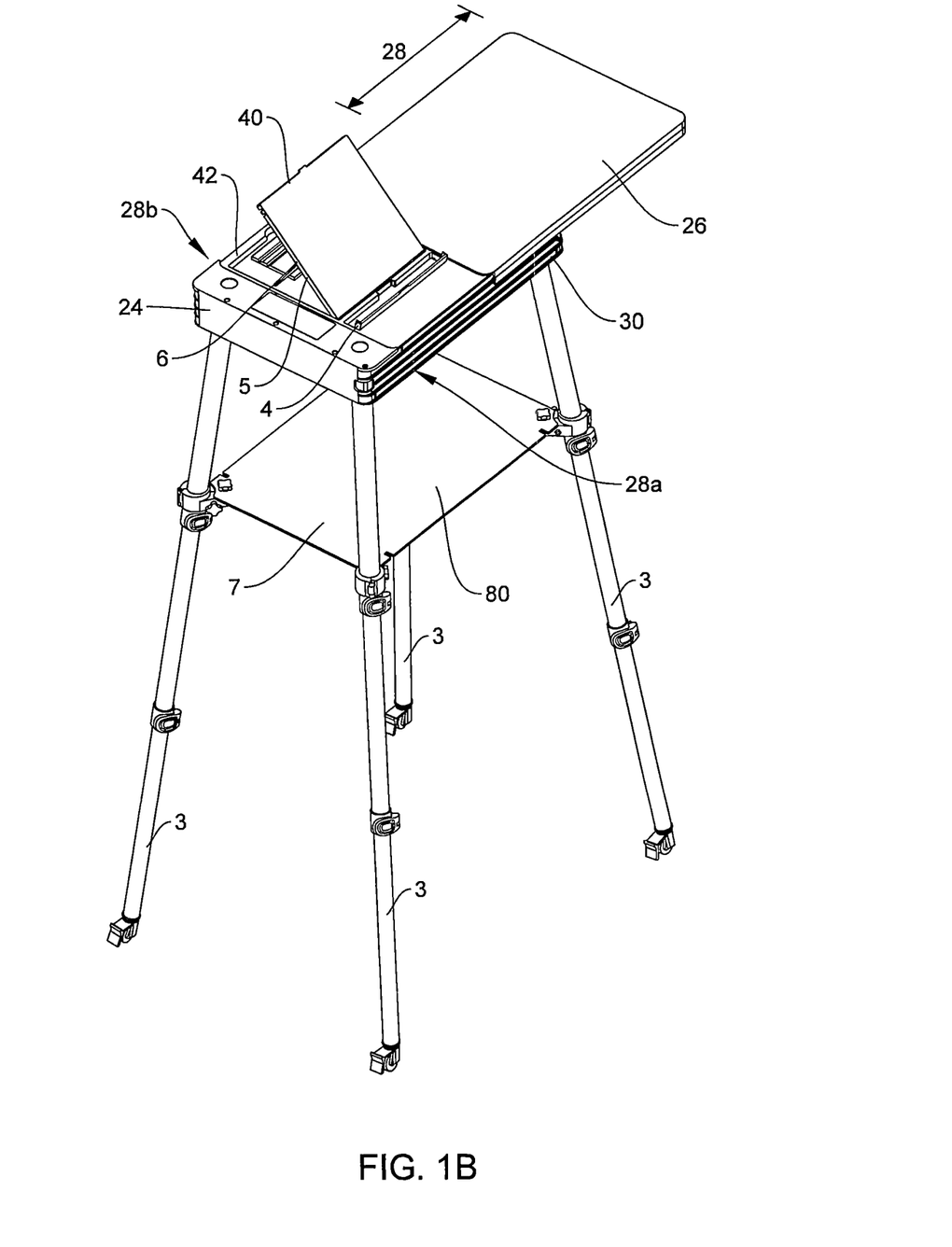
FIG. 1B is a similar view thereof, shown with a sliding bottom cover positioned attached as an extension to the work surface.
Figure 2:
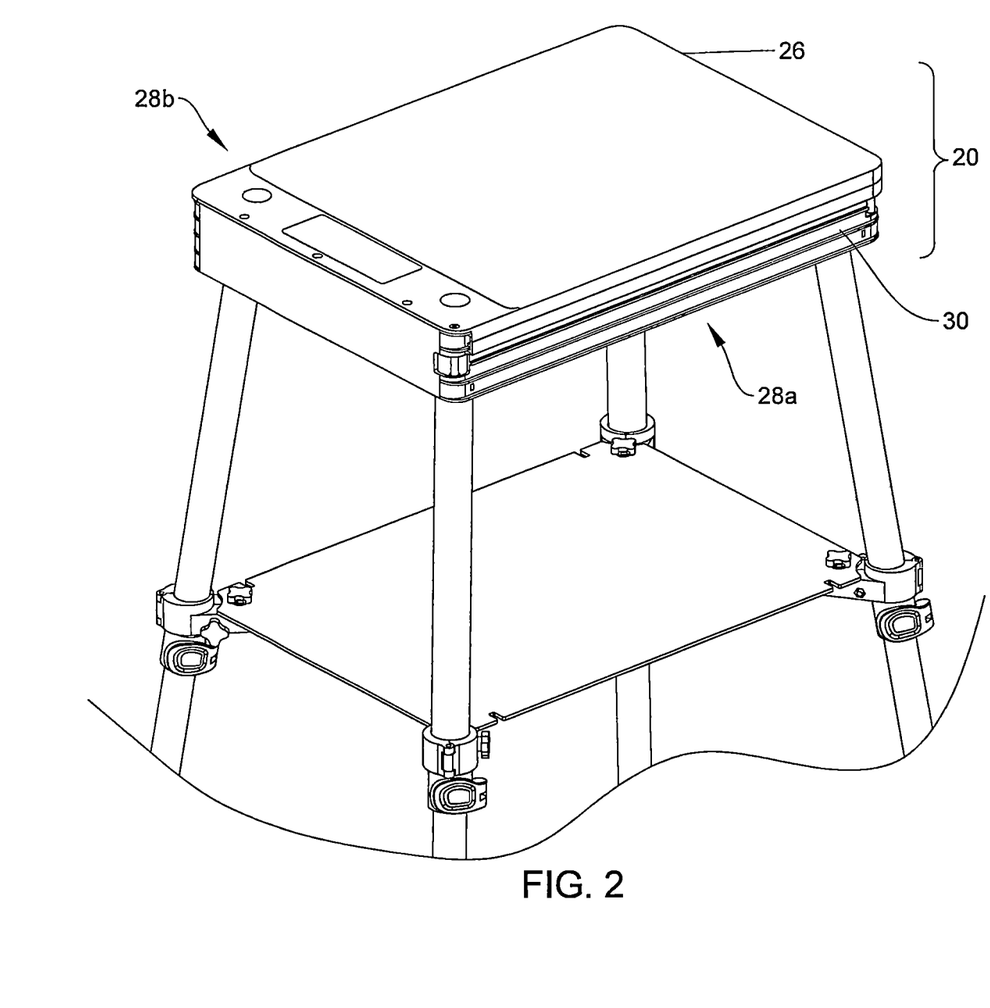
FIG. 2 is a partial upper enlarged view thereof.

Explicitly illustrated in FIGS. 1A, 1B, and 2, the tabletop assembly 20, composed of a rigid plastic planar tabletop 22, serves dual functions as a general work surface and a laptop stand. A plastic storage box 24, integrated beneath tabletop 22, permits access via a bottom cover 26, which, when reversed, extends the work surface by forming an additional utility shelf 28. Track formations 30 on sides 28a and 28b, enable the slidability and removability of cover 26, providing a cavity beneath the tabletop 22 to store system components in its condensed, carryall configuration.

The cover 26, navigable via tracks 30, ensures reversible connectivity to either the upper or lower surface of storage box 24. Aligned tracks 30, which may incorporate ribs, facilitate a secure engagement with a lip of cover 26, guiding its translational motion along the storage box.

As observable across various figures, the tabletop storage box 24 not only constitutes the apex of an upright table, supported by legs, but also converts to a carry case, offering storage for diverse components of the collapsible table system.

Focusing on FIG. 1B, an angularly adjustable slant support 40, which facilitates ergonomic positioning of devices like a laptop, may retract into a cutout portion 42, providing a flush surface when not utilized. This adjustment is enabled by a pivotal connection to the cutout portion 42, with a hinge and a locking mechanism securing it in both upright and retracted positions.

Illustrated through FIG. 5A to FIG. 12D, the height adjustment support system encompasses multiple telescoping legs 50, each designed with an adjustable length, translating to the "height" of work surface 22. Constructed from a plurality of telescoping, nesting leg elements 52, each leg ensures adaptive height adjustments, ranging ideally between 19" and 47", through the telescoping action of sequentially increasing diameters of its components, which may be of hollow aluminum or steel construction.

According to one aspect of the present invention, an adjustable support height may be achieved that corresponds to a standard desktop height of about between 28 to 30 inches (71 to 76 cm) from the floor to the tabletop.

According to another aspect of the present invention, an adjustable support height may be achieved that corresponds to a standard standing desk height of about between 35 and 47 inches (89 to 119 cm) from the floor to the tabletop.

According to another aspect of the present invention, an adjustable support height may be achieved that corresponds to a standard reception desk height of about between 42 and 48 inches.

Figures 5A, 5B:
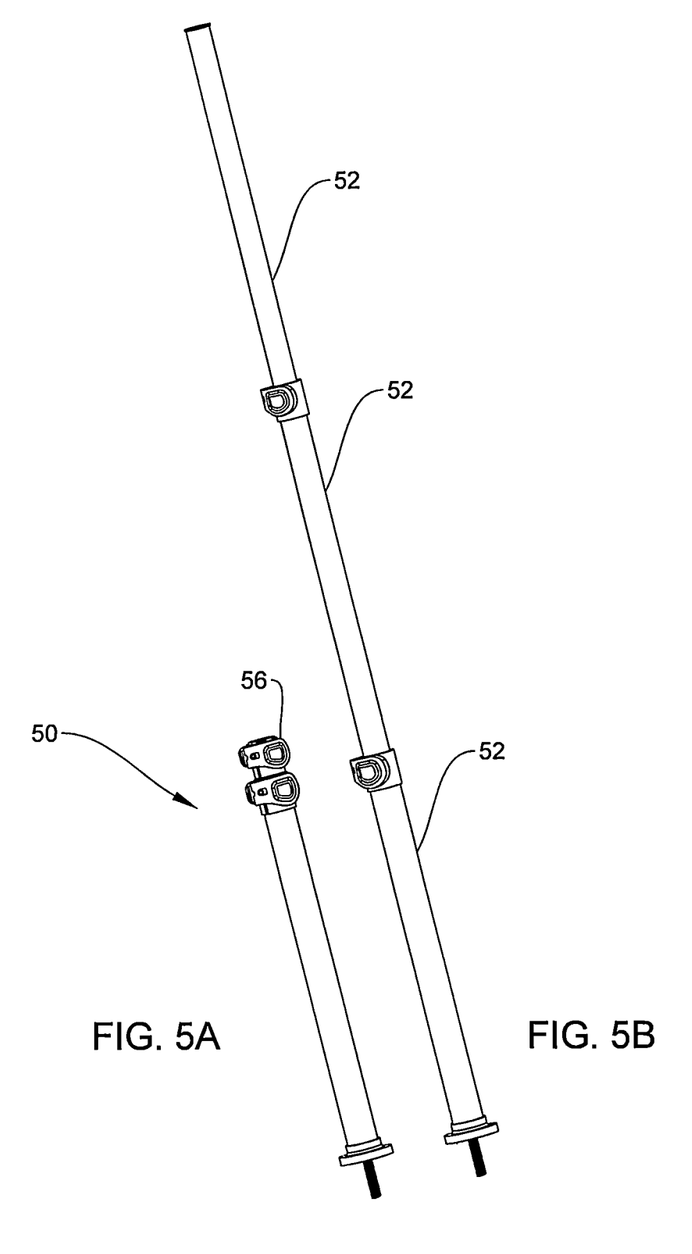
FIG. 5A and FIG. 5B are plan view of a telescoping leg assembly shown in a retracted and deployed condition, respectively.

The legs 50, essential for stable structure deployment and operation, can be secured at a desired length by situating each selected nested leg element 52 and securing to its adjacent element using a clamping mechanism 56. Varied methods, such as using a pin, fastener, frictional engagement, magnets, or clamps, may be employed to selectively lock or unlock the segments 52, enabling the collapsing or extending of each leg 50.

Figure 6:
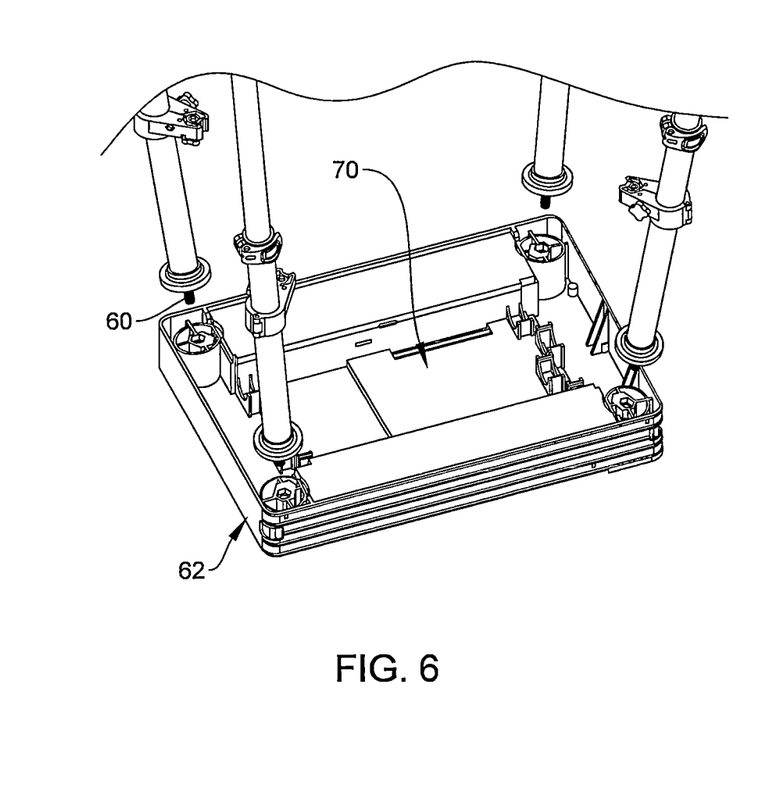
FIG. 6 is a partial lower perspective view showing legs being attached to a lower surface.
Figure 7:
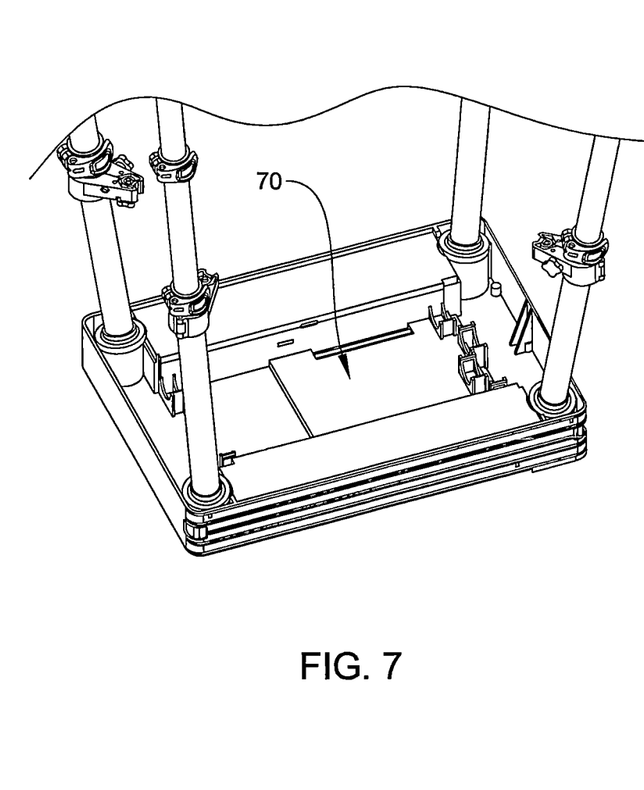
FIG. 7 is a similar view showing the legs secured therein.
Figure 8:
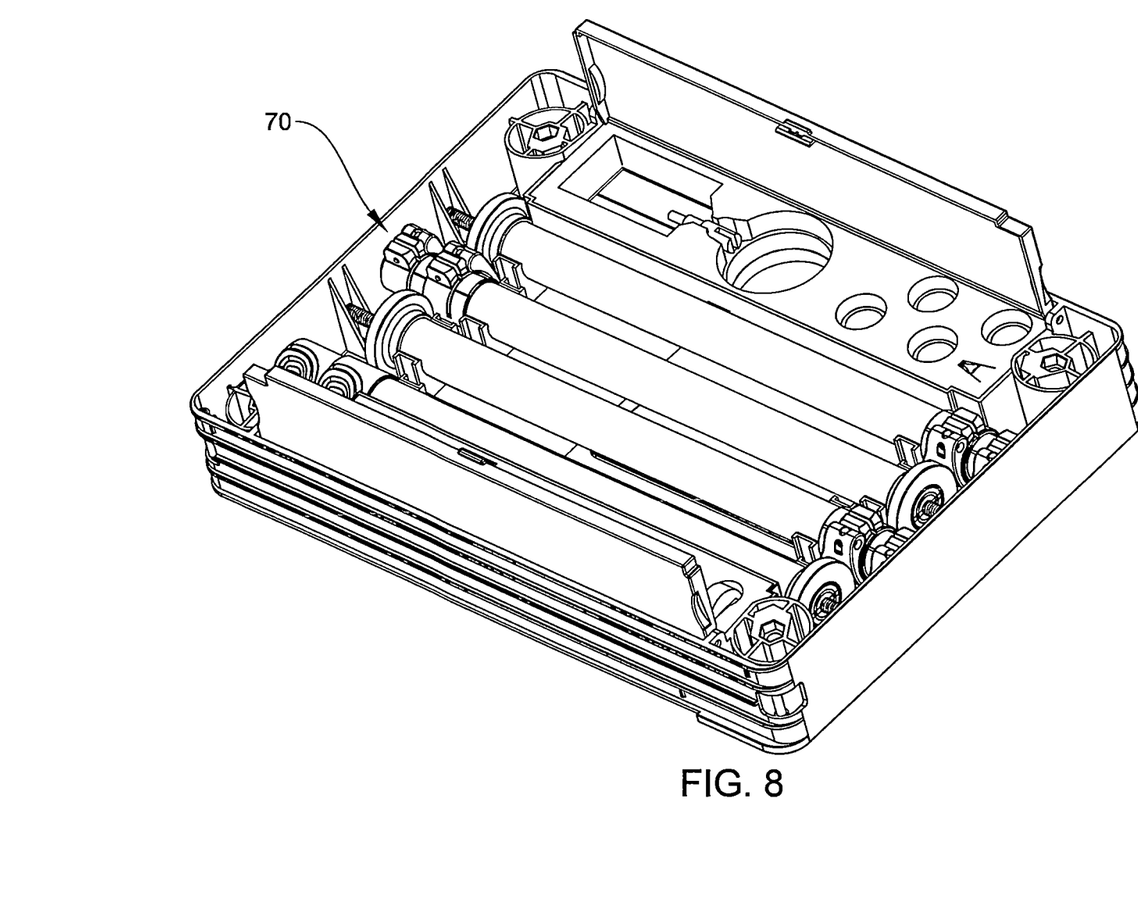
FIG. 8 is a front lower perspective view of the lower surface of the work surface shown having legs and other elements retained for storage.
Figure 9:
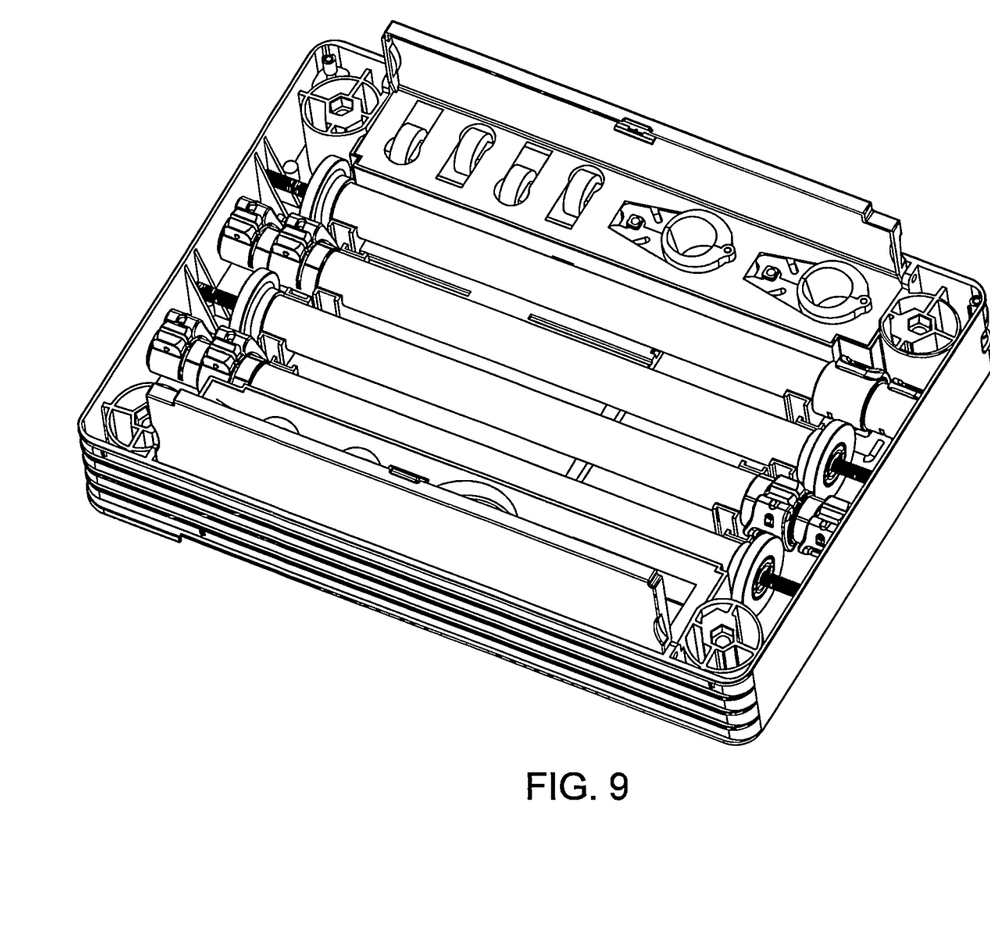
FIG. 9 is a rear lower perspective view thereof.
Figure 10:
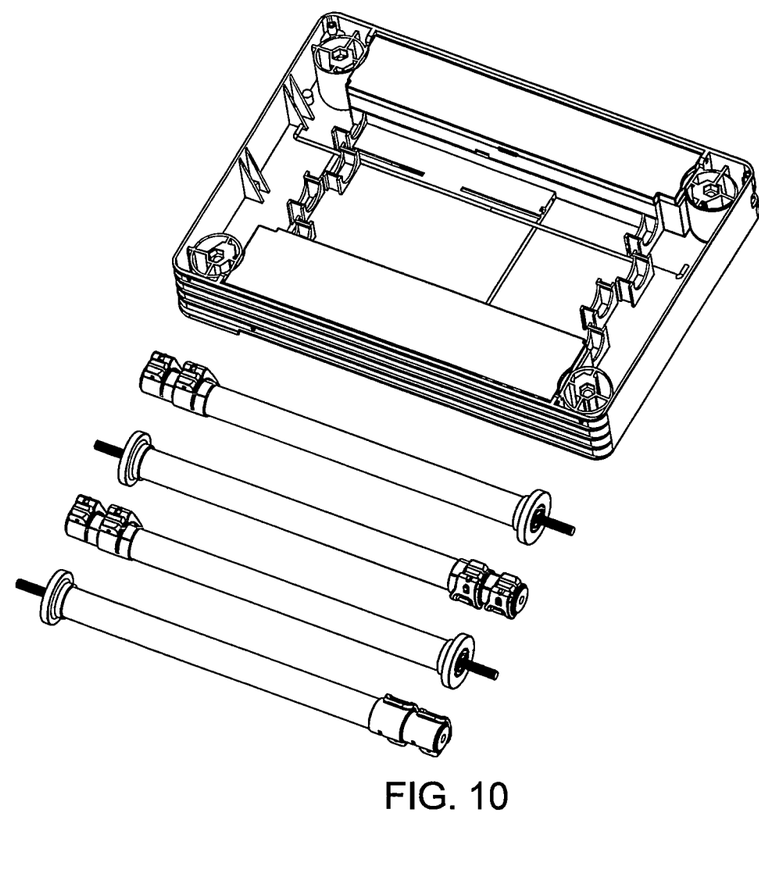
FIG. 10 is a rear lower partially exploded perspective view thereof.

As demonstrated in FIG. 6 and FIG. 7, these legs 50 assure stability by removably securing a leg 50 to a lower surface through threaded engagement between a leg attachment thread 60 and a corresponding leg receiver 62, positioned on the tabletop 20. Legs, when fully retracted, are engineered to stow within the plastic box 22, providing a compact, storable form.

Figure 11:
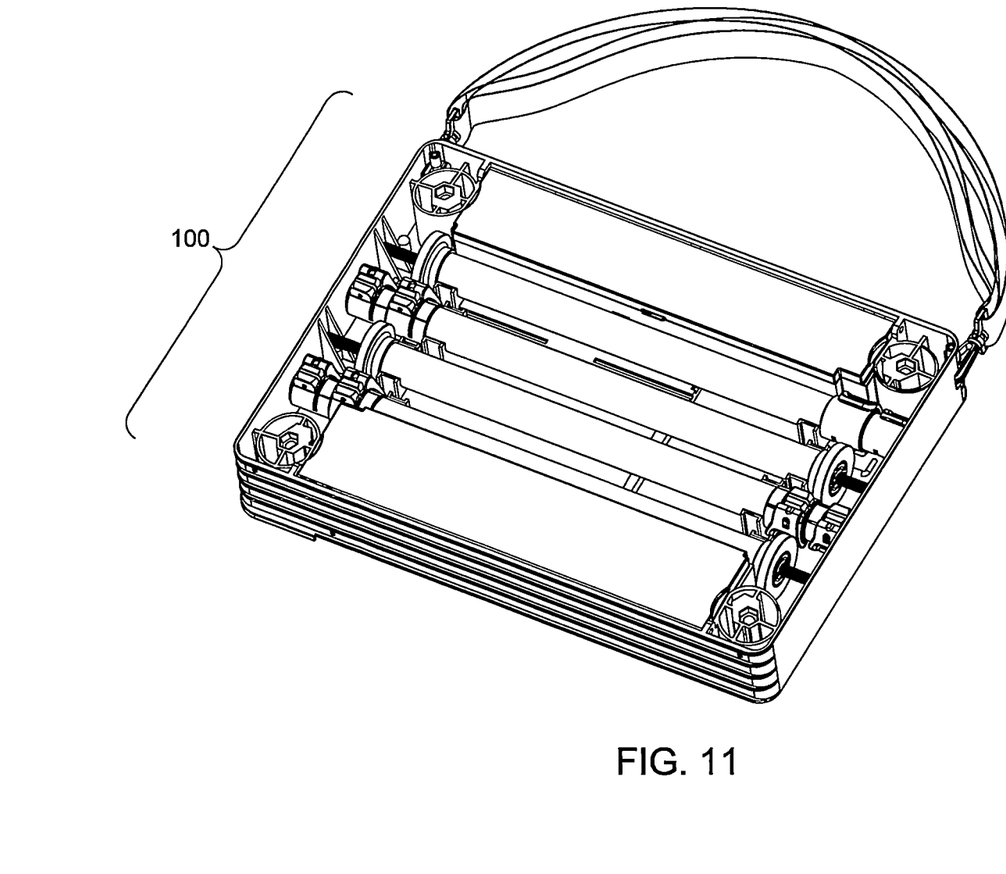
FIG. 11 is a perspective view of portable standing desk assembly configured in the form of a carry case.
Figure 12A:
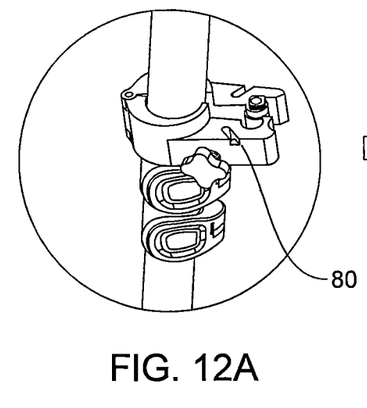
FIG. 12A through FIG. 12D are detail perspective views of the stabilizing system showing steps associated with its installation and activations.
Figure 12B:
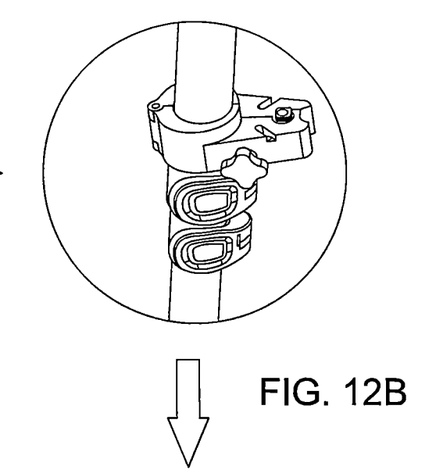
Figure 12C:
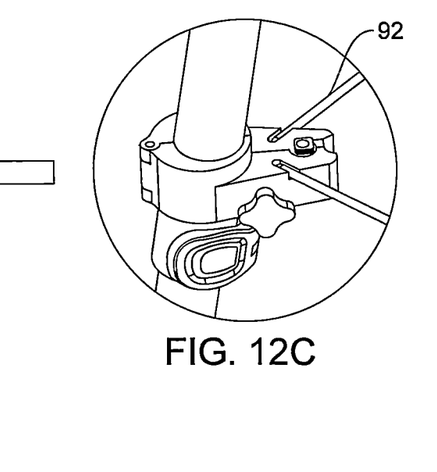
Figure 12D:
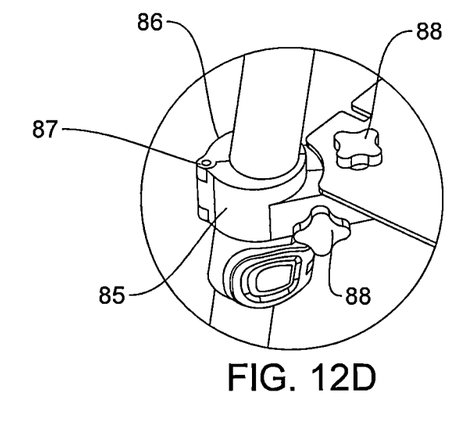

When transformed into a carry case 100, as delineated in FIG. 11, the storage cavity 70 within tabletop 20 can house components like telescoping legs 50, utility shelf 80, and additional accessories, ensuring compact, self-contained storage and convenient transportability.

Notwithstanding the in-depth detail in prior art regarding portable computer tables, certain limitations persist, particularly in sustaining stability when fully extended to accommodate standing desk heights. Potential instability might arise due to the amplified leverage on joint and locking mechanisms, lateral movement at elongated lengths, and the impact of uneven weight distribution.

Figure 3:
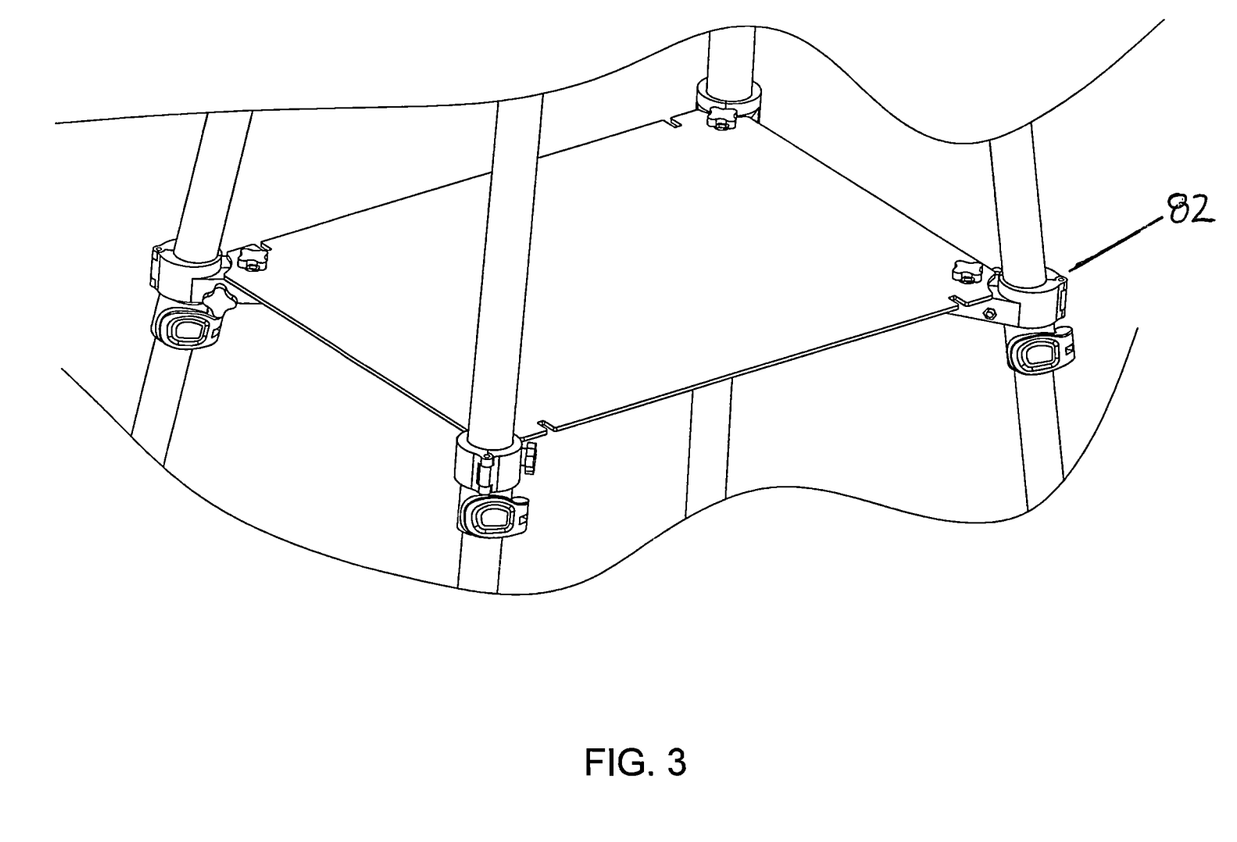
FIG. 3 is a partial center enlarged view thereof.
Figure 4:
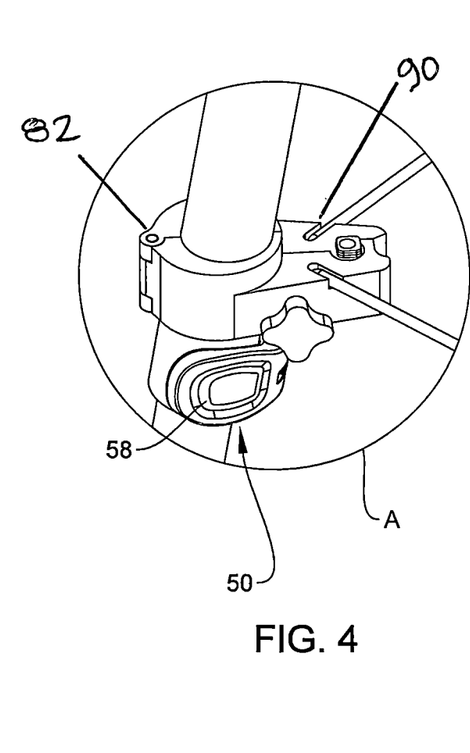
FIG. 4 is a detailed view of a stabilizing connection taken along Detail IV of FIG. 1 through 3.

Addressing the identified frailties, an enhanced stabilization system is hereby introduced as an inherent feature of the present invention. FIGS. 3 and 4 aptly illustrate the system, which incorporates numerous advanced clamping mechanisms (referred to generally as clamps 82) and stability members 92 synergistically functioning with shelf 80. The establishment of a tabletop that is both rigid and resistant to flexing under load is crucial for maintaining stability, especially at increased heights. Thus, the stabilization system envelops the supporting legs 50 at the lowermost termination of each upper leg member. Clamping mechanisms 82, each comprising a first portion 85 and a second portion 86 pivotally connected by a hinge 87, also serve to establish connection points for stability members 92 and shelf 80, with a singular clamp 82 allocated per leg 50. The clamp 82, in its optimal embodiment, consists of a pivotable two-part housing that can be removably secured around a leg 50 via a connector 88, such as a large-grip plastic head thumb screw, thereby facilitating hand-tightening without tools. This structural configuration is explicitly intended to serve as the means for selectively securing the legs and for interconnecting the stability members, as claimed.

Every clamp 82 incorporates a stability member-receptive notch 90 positioned between its thumbscrew and distal end, within both the first 85 and second 86 portions. A stability member 92, epitomized by a steel rod ending with an angled tab at each end, is rigidly nested within notch 90, positioned between adjacent legs 50. Clamps 82 sustain the stability members 92 bridging respective legs 50, thus mechanically uniting multiple legs at the upper segment's lowermost point, forming a "structural web". This configuration amplifies rigidity and stability, ensuring the equal distribution of loads and stresses throughout the interconnected assembly, thereby enhancing the structural fortitude and stability of the overall structure, especially when elevated, to avert potential mechanical failures or deformities during operation. In this manner, the clamping mechanisms and stability members together constitute the stabilization system referenced in the claims and enable the structure to maintain stability even at standing desk heights.

Additionally, shelf 80 is similarly affixed at each clamp 82 using a large-grip plastic head thumb screw connector 88 that attaches to a corresponding threaded receiver at each clamp's 82 distal end. Aligning the structural web with the shelf 80 in parallel planes—adjacent and offset to the upper planar surface 22—bestows adequate structural integrity to furnish enhanced stability for the entire table system 10 when elevated to standing desk height, approximately 46"-48".

Finally, various attachments may be provided to be selectively attached to the tabletop when in the table configuration to provide various functionalities. These may include:

- screw-on wheels 200, which may be affixed to the lower terminus of each leg 50, provides mobility and easy transportation of the stand across various surfaces;
- a document holder;
- a device holder; and/or
- a cup holder;

wherein each may be removably connected to the tabletop and adapted to be stored in the cavity 70.

It should be appreciated that the attachments shown and described herein are merely exemplary; and that various other attachments known to be useful in connection with a tabletop may be utilized in different embodiments. Overall, a lightweight characteristic remains paramount, with the entire assembly weighing in at under 12 lbs., ensuring portability and ease of relocation for users on the move.

2. Operation of the Preferred Embodiment

As shown best in conjunction with FIG. 12A through FIG. 12D, to employ the invention a user unfurls the telescoping legs 50 from the storage cavity 70, adjusts to the desired height, and locks them in place for a stable workstation. The bottom cover 26 slides off, reverses, and affixes as a utility shelf. The stabilizing feature is deployed by attaching a clamp 82 at each leg 50, locking each in place by tightening the first thumbscrew 88, and then inserting the stability members 92 between adjacent clamps 82. Finally, the shelf 80 is secured at its corners to each clamp 82 via the second thumbscrew 88, tightening all around to provide stability at any selected height. The screw-on wheels 200 may be affixed to the lowermost terminus of each leg to offer optional mobility. On completion of use, all components retract or disassemble for secure storage within the stand's self-contained storage cavity 50, ensuring a compact, portable unit for effortless transport and storage. The mechanical interactions described above illustrate a complete operational cycle of the stabilization system and height adjustment support system, consistent with the claimed method of use.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 US 17 (1997) or *Festo Corp.* v. *Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:

1. A Collapsible Table System adapted for stability at standing desk height, comprising:
   a tabletop assembly, the assembly comprising:
      a rigid planar tabletop;
      a storage box integrated beneath said tabletop;
      a bottom cover, reversible to extend the work surface by forming a utility shelf;
   a height adjustment support system, configured to provide a stable support at a standing desk height, comprising:
      a plurality of telescoping legs, each leg adjustable in length and securely attachable to said tabletop assembly;
      means for selectively securing said telescoping legs at a predefined standing desk height;
   a stabilization system, the stabilization system comprising:
      a plurality of clamping mechanisms, each attachable to a leg of said plurality of telescoping legs, wherein said clamping mechanism comprises:
         a first portion and a second portion, pivotally linked;
         a hinge pivot interconnecting said first and second portions;
         distal ends of said first and second portions configured to be removably connected, defining a leg opening to envelop a leg from said plurality of telescoping legs;
         a stability member-receptive notch positioned between a connector and distal end, within both the first and second portions; and
         said stability member-receptive notch configured to rigidly nest a stability member, positioned between adjacent legs from said plurality of telescoping legs;
      a plurality of stability members, each connectable between said clamping mechanisms, forming a structural web;
      a shelf, connectable to said clamping mechanisms;
      said connector adapted to removably secure said clamping mechanism around said leg, said connector being a large-grip-head thumb screw; and
      said stability members, when connected, form a structural web that distributes loads and stresses throughout the interconnected assembly, thereby enhancing stability especially at said standing desk height;
   wherein said tabletop assembly, said height adjustment support system, and said stabilization system are collaboratively configured to maintain stability when adapted to a standing desk height.

2. The system of claim 1, wherein:
   said height adjustment support system is further adapted to securely maintain said predefined standing desk height between approximately 35 and 47 inches from the floor to the tabletop.

3. The system of claim 1, wherein:
   said clamping mechanisms, stability members, and said shelf are collaboratively operative to fortify said telescoping legs against lateral movement and uneven weight distribution when said table system is adapted to said standing desk height.

4. The system of claim 1, wherein:
   said shelf is secured at each corner to each clamp via a second-large-grip plastic head thumb screw and is configured to establish enhanced lateral stability when said table system is adapted to said standing desk height.

5. The system of claim 1, further comprising wheels, removably attachable at a' lowermost terminus of each leg.

6. The system of claim 1, wherein said entire table system weighs under 12 lbs.

7. The system of claim 1, wherein said clamping mechanism is configured to:
   establish connection points for a shelf, facilitating enhancement of lateral stability, especially when said system is adapted to said standing desk height.

8. The system of claim 1, wherein said clamping mechanism is configured to envelop said telescoping leg at a lowermost termination of an upper leg member thereof, further stabilizing said system at said standing desk height by resisting lateral movement and uneven weight distribution.

9. A stabilization system for a collapsible table adapted for standing desk height, comprising:
   a plurality of clamping mechanisms, each configured to attach to a telescoping leg of the collapsible table, wherein each clamping mechanism comprises:
      a first portion and a second portion, pivotally linked by a hinge pivot;
      distal ends of said first and second portions configured to be removably connected, defining a leg opening to envelop a telescoping leg;
      a large-grip-head thumb screw connector adapted to removably secure said clamping mechanism around said telescoping leg;
      a stability member-receptive notch positioned between said large-grip-head thumb screw connector and said distal end, within both the first and second portions;
      said stability member-receptive notch configured to rigidly nest a stability member positioned between adjacent telescoping legs;
   a plurality of stability members, each configured to be rigidly nested within said stability member-receptive notches of adjacent clamping mechanisms, forming a structural web that distributes loads and stresses throughout interconnected telescoping legs; and
   a shelf connectable to said clamping mechanisms via a second large-grip-head thumb screw connector;
wherein said structural web enhances lateral stability of the collapsible table when adapted to standing desk height by mechanically uniting multiple telescoping legs at their upper segment's lowermost point.

* * * * *